United States Patent
Booher et al.

(10) Patent No.: US 7,699,571 B2
(45) Date of Patent: Apr. 20, 2010

(54) OVER-MOLDED COMPRESSION LIMITER

(75) Inventors: Jason Allen Booher, Atlanta, MI (US); Marc Marcel Pierre Jasseron, Williamsburg, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 518 days.

(21) Appl. No.: 11/616,926

(22) Filed: Dec. 28, 2006

(65) Prior Publication Data

US 2008/0157483 A1  Jul. 3, 2008

(51) Int. Cl.
*F16B 43/00* (2006.01)

(52) U.S. Cl. .................... 411/546; 411/903; 411/999

(58) Field of Classification Search ................ 411/546, 411/547, 902, 903, 82, 82.1, 542, 999; 403/267
See application file for complete search history.

(56) References Cited

U.S. PATENT DOCUMENTS

| | | | | |
|---|---|---|---|---|
| 1,333,015 A * | 3/1920 | Freile | .................. | 200/329 |
| 2,532,344 A * | 12/1950 | Smith | .................. | 403/203 |
| 3,147,963 A * | 9/1964 | Frazier | .................. | 267/30 |
| 3,476,496 A * | 11/1969 | Golden | .................. | 297/215.16 |
| 4,113,398 A * | 9/1978 | Jordan | .................. | 403/267 |
| 4,200,768 A * | 4/1980 | Anhalt et al. | .................. | 174/79 |
| 4,303,362 A * | 12/1981 | Lockhart | .................. | 411/153 |
| 4,837,892 A * | 6/1989 | Lo | .................. | 16/431 |
| 4,941,769 A * | 7/1990 | Natsume | .................. | 403/408.1 |
| 5,255,647 A * | 10/1993 | Kiczek | .................. | 123/195 C |
| 5,523,142 A * | 6/1996 | Bedoussac | .................. | 428/139 |
| 5,660,492 A * | 8/1997 | Bathon | .................. | 403/267 |
| 6,663,330 B2 * | 12/2003 | Powell | .................. | 411/546 |
| 6,705,804 B2 * | 3/2004 | Dierker | .................. | 405/259.5 |

* cited by examiner

*Primary Examiner*—Flemming Saether
(74) *Attorney, Agent, or Firm*—Porter Wright Morris & Arthur LLP; Richard M. Mescher; Dean B. Watson

(57) ABSTRACT

A compression limiter includes a tubular-shaped wall having an outer surface and an inner surface forming a central passage. A plurality of perforations extend through the wall from the outer surface to the inner surface. A plastic component can be formed with the compression limiter by over-molding a plastic body over the compression coupler and extending the plastic body into the plurality of perforations. The compression limiter is thereby firmly secured to the plastic body. Different sized fastener openings can be formed within the compression limiter by extending the plastic body into the central passage of the compression limiter and/or substantially preventing the plastic body from extending into the central passage of the compression limiter.

8 Claims, 3 Drawing Sheets

OVER-MOLDED COMPRESSION LIMITER

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a compression limiter and, more particularly, to a compression limiter utilized to transmit loads of a plastic component.

BACKGROUND OF THE INVENTION

Mechanical fasteners are often utilized to secure a plastic component to another component in a motor vehicle. A metal compression limiter is commonly used in applications where a compressive load is applied to the plastic component. The compression limiter strengthens the plastic and resists the load that is applied. The integrity of the plastic, therefore, is not compromised. Additionally, the compression limiter prevents/reduces plastic material creep which can cause reduction of the fastener tightening torque over time.

Typically, the metal compression limiter is pressed into a bore in the plastic component and receives the fastener. Retention of the pressed-in compression limiter to the plastic component is of concern because they often fall-out prior to final installation of the plastic component. Additionally, the pressed-in compression limiter can press into and deform the material of the second component to which the plastic component is secured, reducing the applied load of the fastener.

In motor vehicle and other applications, the plastic component typically has at least three attachment holes receiving the fasteners. One of the holes is typically a datum hole with a smaller diameter that locates the plastic component, one of the holes is a slotted hole that orients the plastic component, and at least one of the holes is a clearance hole for retention of the plastic component to the other component. This requires at three different compression limiters for a single plastic component which results in a risk that the compression limiters can be inserted in the wrong holes.

Accordingly, there is a need in the art for an improved compression limiter utilized to transmit loads in a plastic component.

SUMMARY OF THE INVENTION

The present invention provides a compression limiter which addresses at least some of the above-noted problems of the related art. According to the present invention, a compression limiter includes, in combination, a tubular-shaped wall having an outer surface and an inner surface forming a central passage. A plurality of perforations extend through the wall from the outer surface to the inner surface.

According to another aspect of the present invention, a plastic component includes, in combination, a compression limiter including a tubular-shaped wall having an outer surface and an inner surface forming a central passage, wherein the compression limiter includes a plurality of perforations extending through the wall from the outer surface to the inner surface, and a plastic body molded over the compression coupler and extending into the plurality of perforations.

According to another aspect of the present invention, a method for forming a plastic component includes the steps of, in combination, providing a compression limiter including a tubular-shaped wall having an outer surface and an inner surface forming a central passage, wherein the compression limiter includes a plurality of perforations extending through the wall from the outer surface to the inner surface, and over-molding a plastic body over the compression coupler so that the plastic body extends into the plurality of perforations.

From the foregoing disclosure and the following more detailed description of various preferred embodiments it will be apparent to those skilled in the art that the present invention provides a significant advance in the technology and art of compression limiters. Particularly significant in this regard is the potential the invention affords for providing a high quality, reliable, low cost assembly with improved retention and reduced risk of incorrect installation. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
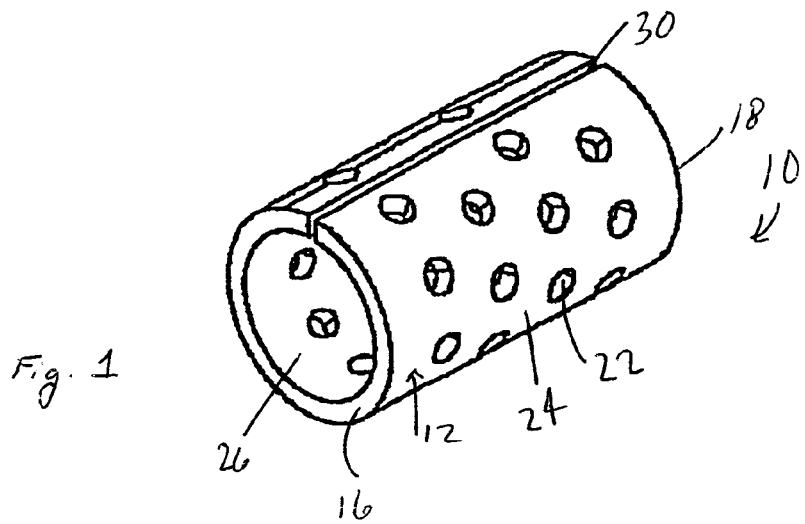
FIG. 1 is a perspective view of a compression limiter assembly according to a preferred embodiment of the present invention.
Figure 2:
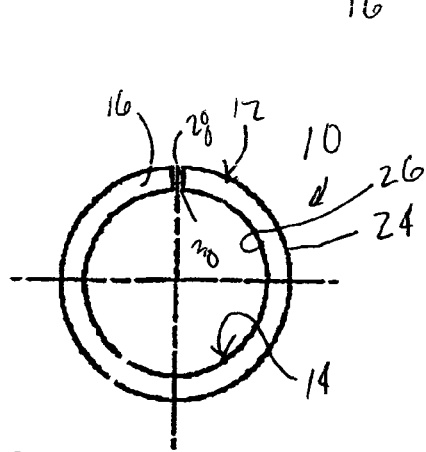
FIG. 2 is an end view of the compression limiter of FIG. 1.
Figure 3:
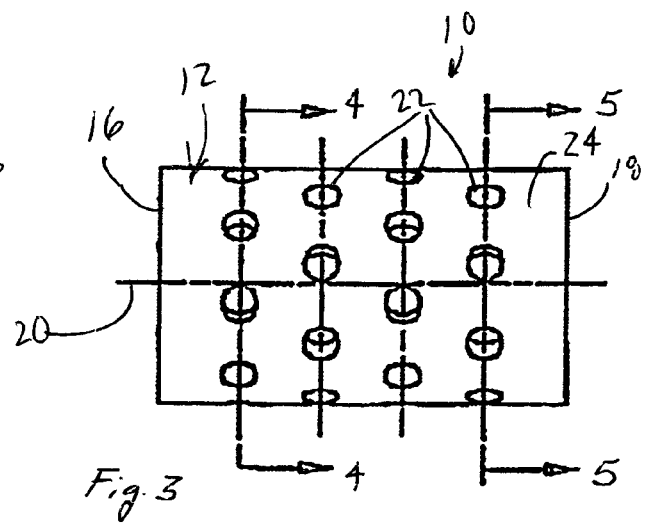
FIG. 3 is a side view of the compression limiter of FIGS. 1 and 2.
Figure 4:
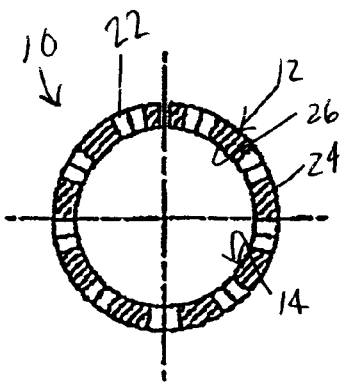
FIG. 4 is cross-sectional view taken along line 4-4 of FIG. 3.
Figure 5:
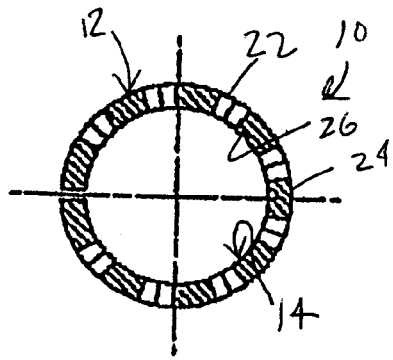
FIG. 5 is cross-sectional view taken along line 5-5 of FIG. 3.

It should be understood that the appended drawings are not necessarily to scale, presenting a somewhat simplified representation of various preferred features illustrative of the basic principles of the invention. The specific design features of a compression limiter as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tire carriers illustrated in the drawings. In general, up or upward refers to an upward direction within the plane of the paper in FIGS. 6 to 8 and down or downward refers to a downward direction within the plane of the paper in FIG. 6 to 8.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved compression limiters disclosed herein. The following detailed discussion of various alternative and preferred embodiments will illustrate the general principles of the invention with reference to securing plastic components of a motor vehicle such as an automobile, truck, van, cross over vehicle, sport utility vehicle (SUV), with recreational vehicle, trailer, off road vehicle such as a dune buggy, industrial or construction equipment, golf cart, or the like. Other embodiments suitable for other applications will be apparent to those skilled in the art given the benefit of this disclosure.

Referring now to the drawings, FIGS. 1 to 5 show a compression limiter or insert 10 according to a preferred embodiment of the present invention. The illustrated compression limiter 10 is generally tubular shaped having a wall 12 forming a central passage or bore 14. The illustrated compression limiter 10 is generally cylindrical-shaped wherein the wall 12 is generally circular-shaped in cross section (best shown in FIGS. 4 and 5) but it is noted that the compression limiter 10 can alternatively have any other suitable shape. A first end 16 of the wall 12 and a second end 18 of the wall 12 are each substantially perpendicular to a central longitudinal axis 20. The central passage 14 extends from the first end 16 to the second end 18 so that the central passage 14 extends entirely through the compression limiter 10 for the passage of a mechanical fastener therethrough as described in more detail hereinafter.

The illustrated compression limiter 10 is provided with a plurality of opening or perforations 22 in the wall 12. The perforations 22 extend from the outer surface 24 of the wall 12 to the inner surface 26 of the wall 12 so that space outside the wall 12 is in communication with the central passage 14 through the perforations 22. The illustrated compression limiter 10 has a plurality of rows of perforations 22 that are longitudinally spaced-apart along the length of the compression limiter 10. The illustrated perforations 22 in each row are spaced-apart about the periphery of the compression limiter 22. The illustrated compression coupler 10 has four rows of perforations 22 but any other suitable quantity of rows can alternatively be utilized. The illustrated compression limiter 10 has eight and nine perforations 22 in alternating rows but any other suitable quantity of perforations can alternatively be utilized. The illustrated rows of perforations 22 are staggered or circumferentially offset to provide uniform holding power and/or distribution of plastic material as described in more detail hereinafter.

The illustrated compression limiter 10 is formed by a roll forming process. A substantially flat sheet of stock is punched, pierced, drilled, or the like to form the plurality of perforations 22 and then rolled to form the tubular shaped compression limiter 10. When rolled, side edges 28 of the compression limiter 10 do not substantially contact, forming a gap or slot 30 between the side edges 28. It is noted that the compression limiter can alternatively be formed in any other suitable manner. The compression limiter 10 is preferably formed of a metal. The metal can be a high carbon steel or the like.

Figure 6:
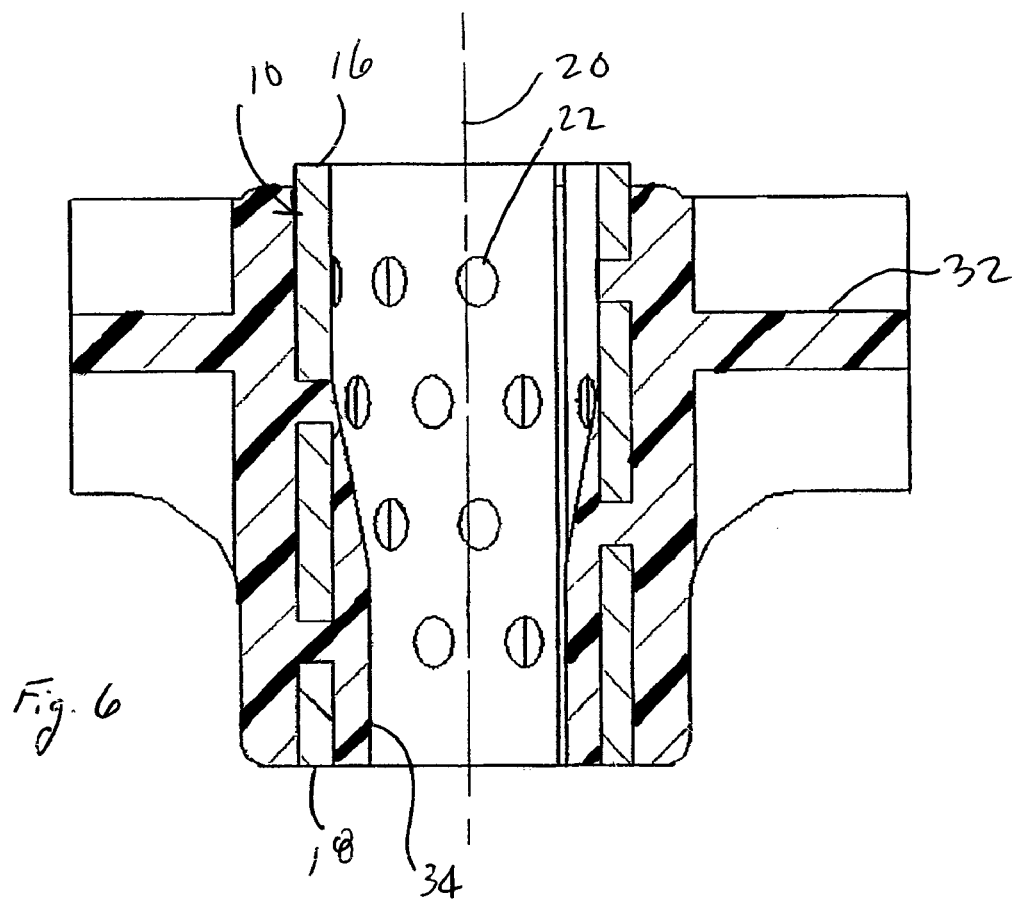
FIG. 6 is cross sectional view of the compression limiter of FIGS. 1 to 5, wherein the compression limiter is located at a first hole of a plastic component.
Figure 7:
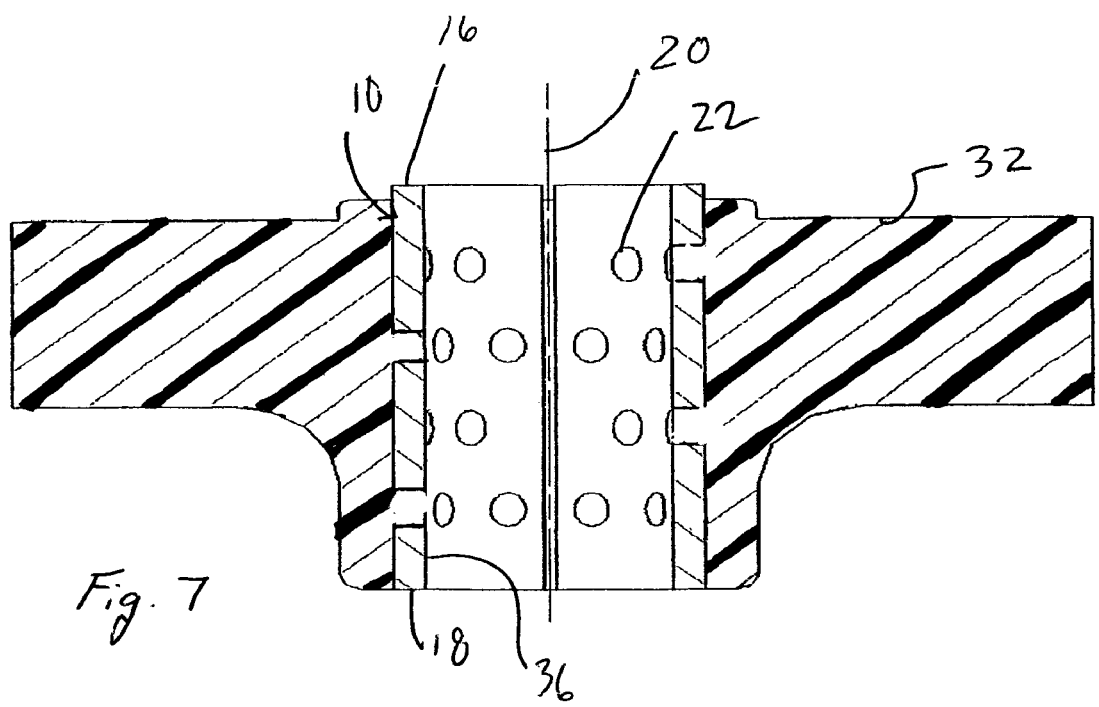
FIG. 7 is cross sectional view of the compression limiter of FIGS. 1 to 5, wherein the compression limiter is located at a second hole of a plastic component.

FIGS. 6 and 7 illustrated two of the compression limiters 10a, 10b installed in a plastic component 32. The component is formed by over-molding plastic material onto the compression limiters 10a, 10b. The compression-limiters 10a, 10b are positioned within a molding tool with pins of the molding tool extending into the compression limiters 10a, 10b. Plastic material is flowed into the molding tool to form the plastic component 32. Plastic material flows into and fills the perforations 22 to securely retain the compression limiter 10 to the remainder of the plastic component 32.

The pins of the molding tool can be sized to obtain desired hole or bore sizes for the mechanical fasteners. In the illustrated embodiment, the compression limiters 10 are identical in size and shape but the molding tool pins are shaped and sized differently to obtain the different hole sizes desired. The compression limiter 10a, 10b, is sized to have a central passage 14 with a diameter equal to the largest clearance hole desired. One of the illustrated pins is sized and shaped so that the plastic material not only flows into and fills the perforations 22 of the compression coupler 10a, but also flows into the central passage 14 between the compression coupler 10a, and the molding tool pin to form a hole or bore 34 having a diameter smaller than the central passage 14 of the compression coupler 10. The hole 34 is preferably sized to as a datum hole to closely receive a fastener to locate the component 32 relative to another component to which it is secured. The other one of the illustrated pins is sized and shaped to fully fill the central passage 14 so that the plastic material only flows into and fills the perforations 22 of the compression coupler 10b. No plastic material flows into the central passage 14 between the compression coupler 10b and the molding tool pin. Thus, the hole or bore 36 is equal to the central passage 14 of the compression coupler 10. The hole 36 is preferably sized to as a clearance hole to loosely receive a fastener to secure the component 32 to the another component. It is noted, that the clearance hole can alternatively be formed as the datum hole if desired but sized for a clearance fit rather than a close fit with the fasteners. It is also noted that the component 32 typically has a single datum hole 34 and a plurality of clearance holes 36 but any one type or combination of desired holes 34, 36 can be utilized within the scope of the present invention, for example, two datum holes 34 can be utilized to both position and orient the plastic component relative to the second component 38.

Figure 8:
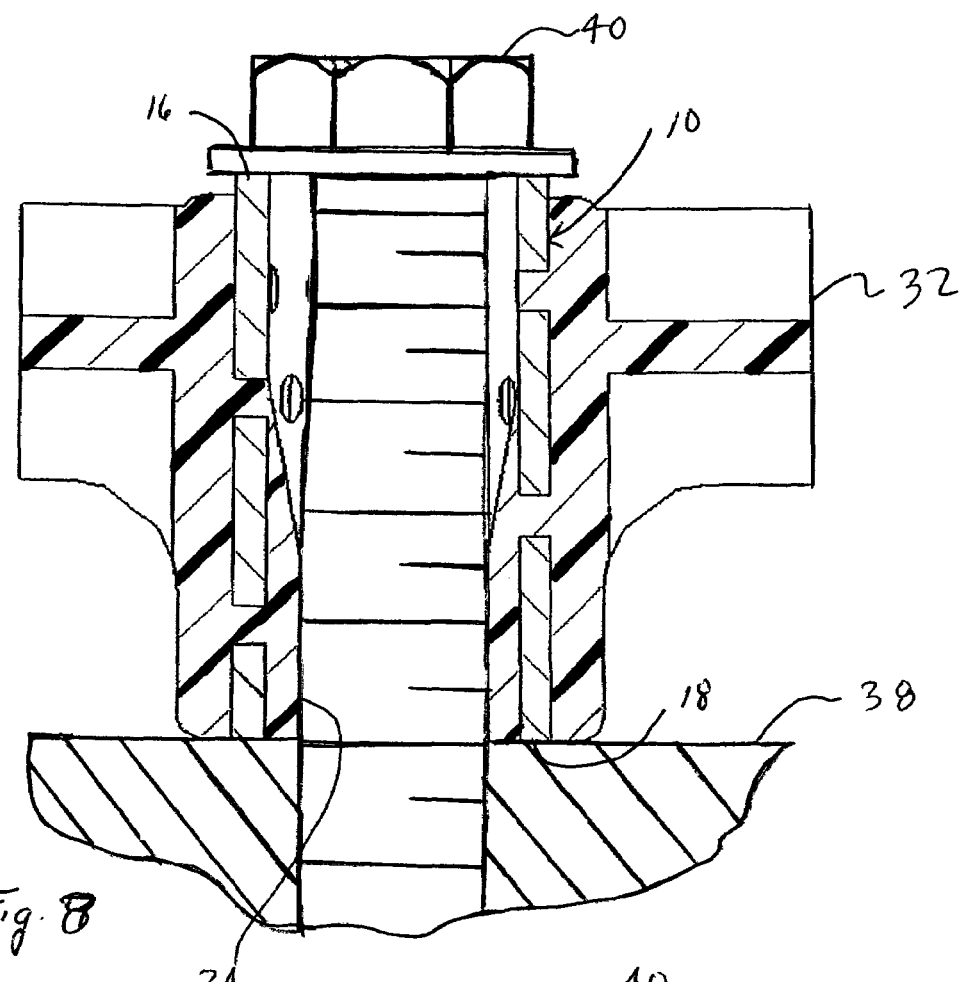
FIG. 8 is cross sectional view of the compression limiter of FIG. 6, wherein the plastic component is secured to another component.
Figure 9:
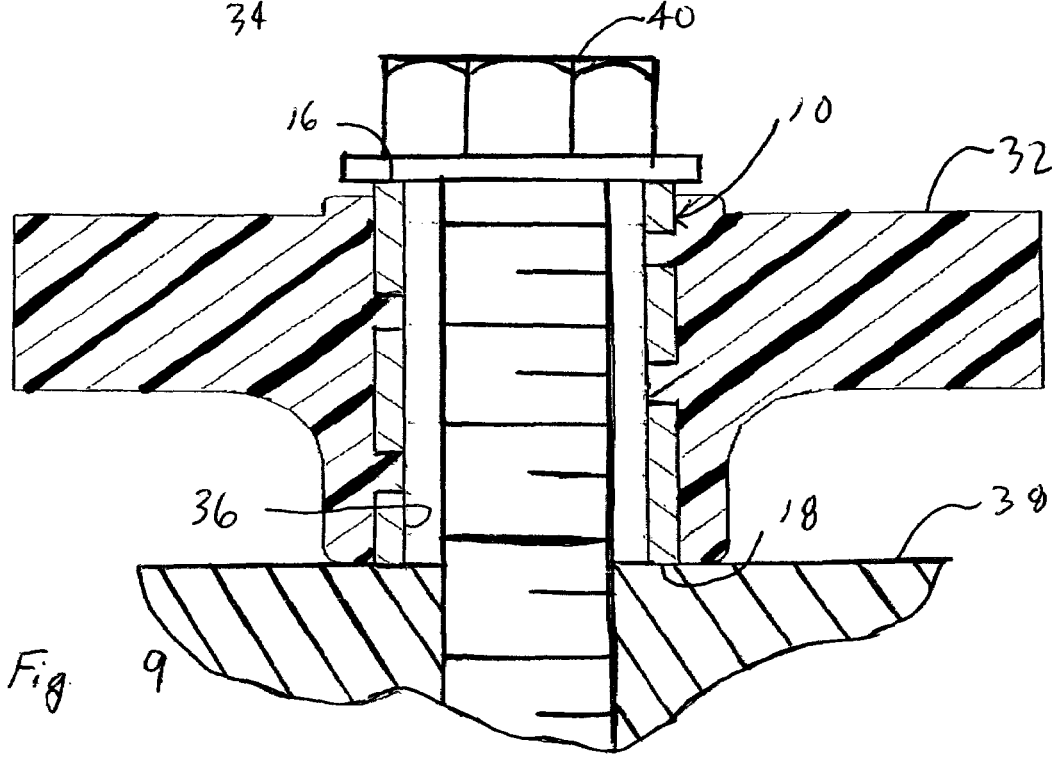
FIG. 9 is cross sectional view of the compression limiter of FIG. 7, wherein the plastic component is secured to the another component.

As illustrated in FIGS. 8 and 9, the compression limiters 10a, 10b are utilized on the plastic component 32 to transmit fastener load to another or second component 38 in areas where mechanical fasteners 40 are located to secure the plastic component 32 to the another component 38. The heads of the illustrated fasteners 40 engage the upper or first end 16 of the compression limiters 10a, 10b and the second ends 18 of the compression limiters 10a, 10b engage the second component 38 so that the compressive force generated by the fasteners 40 is carried through the compression limiters rather than the plastic portion of the plastic component 32. The fastener 40 within the datum hole 34 is closely received by the datum hole 34 to locate the plastic component 32 relative to the second component 38. The fastener 40 within the clearance hole 36 is loosely received by the clearance hole 36 (as seen by the gap formed therein).

From the foregoing disclosure and detailed description of certain preferred embodiments of the present invention, it is apparent that the compression limiter 10 of the present invention is securely retained in the plastic component so that it will not undesirably fall out prior to assembly. It is also apparent, that a single size and shape of compression limiter 10 can be utilized on the plastic component to form different sized and shaped fastener holes 34, 36 to eliminate the mistake of the wrong compression limiter 10 being installed in the wrong location as is common when different sized compression limiters 10 are utilized on the same plastic component. It is noted that the compression limiter 10 of the present invention provides the benefit of an improved connection with the plastic component 32, even when different sized compression limiters 10 are used on the same plastic component 32.

From the foregoing disclosure and detailed description of certain preferred embodiments of the present invention, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A plastic component comprising, in combination:
    a compression limiter including a tubular-shaped wall having an outer surface and an inner surface forming a central passage;
    wherein the compression limiter includes a plurality of perforations extending through the wall from the outer surface to the inner surface;
    a plastic body molded over the compression coupler and extending into the plurality of perforations;
    wherein the plastic body extends within the central passage of the compression limiter to form a hole smaller than the inner surface of the compression limiter;
    a second compression limiter including a tubular-shaped wall having an outer surface and an inner surface forming a central passage;
    wherein the second compression limiter includes a plurality of perforations extending through the wall from the outer surface to the inner surface; and
    wherein the plastic body does not substantially extend within the central passage of the second compression limiter.

2. The plastic component according to claim 1, wherein the wall is cylindrically shaped.

3. The plastic component according to claim 1, wherein the plurality of perforations are in a plurality of longitudinally spaced-apart rows.

4. The plastic component according to claim 3, wherein adjacent rows of the perforations are circumferentially offset.

5. The plastic component according to claim 1, wherein the perforations are circular.

6. The plastic component according to claim 1, wherein the wall comprises high carbon steel.

7. A method of forming a plastic component comprising the steps of, in combination:
    providing a compression limiter including a tubular-shaped wall having an outer surface and an inner surface forming a central passage;
    wherein the compression limiter includes a plurality of perforations extending through the wall from the outer surface to the inner surface;
    over-molding a plastic body over the compression coupler so that the plastic body extends into the plurality of perforations;
    extending the plastic body within the central passage of the compression limiter to form a hole within the compression limiter smaller than the inner surface of the compression limiter;
    providing a second compression limiter including a tubular-shaped wall having an outer surface and an inner surface forming a central passage;
    wherein the second compression limiter includes a plurality of perforations extending through the wall from the outer surface to the inner surface; and
    preventing the plastic body from substantially extending within the central passage of the second compression limiter.

8. The method according to claim 7, further comprising the steps of extending different sized molding tool pins into the first and second compression limiters during the step of over-molding the plastic body.

* * * * *